(12) United States Patent
Xu et al.

(10) Patent No.: US 10,245,620 B2
(45) Date of Patent: Apr. 2, 2019

(54) PARCEL SORTING SYSTEM AND METHOD

(71) Applicants: Hangzhou Yameilijia Technology Co., Ltd., Hangzhou (CN); Jianqiang Zhu, Hangzhou (CN)

(72) Inventors: Juejing Xu, Hangzhou (CN); Jianqiang Zhu, Hangzhou (CN)

(73) Assignees: Hangzhou Yameilijia Technology Co., Ltd., Hangzhou (CN); Jianqing Zhu, Hangzhou (CN)

( * ) Notice: Subject to any disclaimer, the term of this patent is extended or adjusted under 35 U.S.C. 154(b) by 0 days.

(21) Appl. No.: 15/326,411

(22) PCT Filed: Jul. 20, 2016

(86) PCT No.: PCT/CN2016/090684
§ 371 (c)(1),
(2) Date: Jan. 13, 2017

(87) PCT Pub. No.: WO2017/012548
PCT Pub. Date: Jan. 26, 2017

(65) Prior Publication Data
US 2018/0117634 A1    May 3, 2018

(30) Foreign Application Priority Data

Jul. 22, 2015    (CN) .......................... 2015 1 0433995

(51) Int. Cl.
*B07C 3/00* (2006.01)
*B07C 3/02* (2006.01)
(Continued)

(52) U.S. Cl.
CPC ................ *B07C 3/18* (2013.01); *B07C 3/008* (2013.01); *B07C 3/02* (2013.01); *B07C 3/08* (2013.01);
(Continued)

(58) Field of Classification Search
CPC .. B07C 3/08; B07C 3/008; B07C 3/14; B65G 1/06; B65G 1/0492
(Continued)

(56) References Cited

U.S. PATENT DOCUMENTS 4,690,283 A     9/1987  Carrell
6,005,211 A  *  12/1999 Huang ...................... B07C 3/02
                                               198/370.06
(Continued)

FOREIGN PATENT DOCUMENTS

CN           1267628 A      9/2000
CN           1367722 A      9/2002
(Continued)

OTHER PUBLICATIONS

"Chinese Application Serial No. 201510433995.5, Office Action dated Jan. 3, 2017", w/ English Translation, 19 pgs.
(Continued)

*Primary Examiner* — Terrell H Matthews
(74) *Attorney, Agent, or Firm* — Schwegman Lundberg & Woessner, P.A.

(57) ABSTRACT

A parcel sorting system and method. The parcel sorting system comprises a parcel sorting device (100) and a parcel collecting device (101); the parcel sorting device is provided thereon with a plurality of parcel inspection inlets (104) and a plurality of parcel outlets (102), and the parcel collecting device is located just below the parcel sorting device; the parcel outlets on the parcel sorting device communicate with the parcel collecting device; the parcel outlets are respectively located at the middle or/and edges of the parcel sorting device; the parcel collecting device is provided thereon with storage devices (103) at positions under respective parcel outlets; and diameter of the storing device is larger than that of the parcel outlet. When the method is used, the parcel
(Continued)

sorting efficiency is obviously improved; the implementation is convenient; and popularization and application are facilitated.

10 Claims, 3 Drawing Sheets

(51) Int. Cl.
    *B07C 3/08*     (2006.01)
    *B07C 3/14*     (2006.01)
    *B65G 1/04*     (2006.01)
    *B07C 3/18*     (2006.01)
    *B65G 1/06*     (2006.01)
    *B65G 1/137*     (2006.01)
    *G06Q 10/08*     (2012.01)
    *G06Q 50/30*     (2012.01)

(52) U.S. Cl.
    CPC .............. *B07C 3/14* (2013.01); *B65G 1/0492* (2013.01); *B65G 1/06* (2013.01); *B65G 1/137* (2013.01); *B65G 1/1373* (2013.01); *G06Q 10/08* (2013.01); *G06Q 10/087* (2013.01); *B07C 2301/00* (2013.01); *B65G 1/0464* (2013.01); *B65G 2201/0285* (2013.01); *B65G 2203/0216* (2013.01); *B65G 2203/044* (2013.01); *B65G 2209/02* (2013.01); *G06Q 50/30* (2013.01)

(58) Field of Classification Search
    USPC ........................................ 209/509, 583, 552
    See application file for complete search history.

(56) References Cited

U.S. PATENT DOCUMENTS

| | | | |
|---|---|---|---|
| 2002/0112996 A1 | 8/2002 | Linge et al. | |
| 2011/0272241 A1* | 11/2011 | Van Haaster | B07C 5/36 198/348 |
| 2012/0138514 A1* | 6/2012 | Janssens | B07C 5/342 209/577 |
| 2014/0091015 A1* | 4/2014 | Kim | B07C 3/02 209/584 |

FOREIGN PATENT DOCUMENTS

| | | |
|---|---|---|
| CN | 101664740 A | 3/2010 |
| CN | 103331266 A | 10/2013 |
| CN | 203304196 U | 11/2013 |
| CN | 203711345 U | 7/2014 |
| CN | 203764559 U | 8/2014 |
| CN | 104525488 A | 4/2015 |
| CN | 105057219 A | 11/2015 |
| CN | 204817212 U | 12/2015 |
| CN | 204817213 U | 12/2015 |
| JP | 2000288476 A | 10/2000 |
| WO | WO-2012123513 A1 * | 9/2012 ............ B65B 5/108 |

OTHER PUBLICATIONS

"Chinese Application Serial No. 201510433995.5, Office Action dated Apr. 8, 2018", w/o English Translation, 6 pgs.
"Chinese Application Serial No. 201510433995.5, Office Action dated Sep. 11, 2017", w/ English Translation, 27 pgs.
"International Application Serial No. PCT/CN2016/090684, International Search Report dated Oct. 31, 2016", 2 pgs.
"International Application Serial No. PCT/CN2016/090684, Written Opinion dated Oct. 31, 2016", 7 pgs.

* cited by examiner

PARCEL SORTING SYSTEM AND METHOD

This application is a U.S. National Stage Filing under 35 U.S.C. 371 from International Application No. PCT/CN2016/090684, filed on Jul. 20, 2016, which claims the benefit of priority to China Patent Application No. 201510433995.5, filed on Jul. 22, 2015, each of which is hereby incorporated by reference herein in its entirety.

TECHNICAL FIELD

The present invention relates to sorting technology, and specifically to a parcel sorting system and method.

BACKGROUND ART

Parcel sorting means dispensing parcels going to different destinations to different exits through a delivery device, so as to realize unified transport of parcels going to the same destination. After researches, the inventors has found that the current parcel sorting is mainly realized in a sorting line, wherein the total sorting speed is limited by the line running speed, the space for improving the line running speed is limited, and it would make the whole line stop working in a situation where a failure occurs at any point of the sorting line, and the line can start to work only after repairing. Moreover, in the current parcel sorting systems, parcel outlets are all provided at the edges of checking platforms. The increasing number of parcels requires more parcel outlets which are all provided on the edges of the checking platforms. As the area of the checking platforms is limited, while the number of the parcel outlets is increased, the parcels would easily be accumulated and is difficult to transport, which greatly reduces the checking efficiency of the parcels.

DISCLOSURE OF THE INVENTION

In this regard, examples of the present invention are directed to provide a parcel sorting system and method, so as to solve the problem existing in the prior art that the parcel sorting efficiency needs to be increased.

In order to achieve the above-mentioned object, the examples of the present invention utilize the technical solutions as follows:

In a first aspect, an example of the present invention provides a parcel sorting system, which includes a parcel sorting device and a parcel collecting device; the parcel sorting device is provided thereon with a plurality of parcel checking inlets and a plurality of parcel outlets, and the parcel collecting device is located just below the parcel sorting device;

the plurality of parcel outlets on the parcel sorting device are respectively in communication with the parcel collecting device, the plurality of parcel outlets are respectively located at the middle or/and edges of the parcel sorting device, the parcel collecting device is provided thereon with storage devices, with one storage device located at each of positions under the parcel outlets, and an opening diameter of the storage device is greater than a diameter of the parcel outlet.

Combining with the first aspect, an example of the present invention provides a first possible embodiment of the first aspect, wherein each of the parcel checking inlets is provided with one parcel information acquisition device, and the parcel checking inlets are in one-to-one correspondence with the parcel information acquisition devices, the parcel information acquisition device is configured to acquire parcel information of the parcel to be sorted at the parcel checking inlet corresponding to the parcel information acquisition device, and the parcel information contains a destination of the parcel to be sorted.

Combining with the first possible embodiment of the first aspect, an example of the present invention provides a second possible embodiment of the first aspect, wherein the system further includes a control device, the control device is in connection with all the parcel information acquisition devices so as to obtain the parcel information acquired by all the parcel information acquisition devices, to obtain the destinations of the respective parcels to be sorted;

The system further includes a plurality of mobile transport devices, wherein the plurality of mobile transport devices are all in connection with the control device, the control device is pre-provided with parcel outlets respectively corresponding to different destinations, the control device is further configured to control, according to the obtained destinations of the parcels to be sorted, at least one of the mobile transport devices to transport the parcels to be sorted to the parcel outlets corresponding to the destinations of the parcels to be sorted.

Combining with the second possible embodiment of the first aspect, an example of the present invention provides a third possible embodiment of the first aspect, wherein the system further includes a detection device and a transfer device, the detection device is configured to detect whether the storage device is full and to transmit to the control device the obtained information about whether the storage device is full, and the transfer device is configured to transfer the storage device which is full according to an instruction from the control device.

Combining with the third possible embodiment of the first aspect, an example of the present invention provides a fourth possible embodiment of the first aspect, wherein each of the mobile transport devices is configured to load one parcel to be sorted or a plurality of parcels to be sorted that go to the same destination;

destination information is carried in a destination address information code, the destination address information code is provided on the parcel to be sorted, each of the parcel information acquisition devices includes a scanner, and the scanner is configured to scan the information code for obtaining the destination of the parcel to be sorted.

In a second aspect, an example of the present invention provides a parcel sorting method, which is applied to a parcel sorting system, wherein the parcel sorting system includes a parcel sorting device and a parcel collecting device; the parcel sorting device is provided thereon with a plurality of parcel checking inlets and a plurality of parcel outlets, and the parcel collecting device is located just below the parcel sorting device; the plurality of parcel outlets on the parcel sorting device are respectively in communication with the parcel collecting device, the plurality of parcel outlets are respectively located at the middle or/and edges of the parcel sorting device, and the parcel collecting device is provided thereon with storage devices, with one storage device located at each of positions under the parcel outlets, and an opening diameter of the storage device is greater than a diameter of the parcel outlet, and the method includes:

presetting correspondence relationships between the parcel outlets and the parcels to be sorted that go to different destinations;

obtaining the destinations of the parcels to be sorted;

transporting the parcels to be sorted to the parcel outlets corresponding to the destinations of the parcels to be sorted; and delivering, through the parcel outlets, the parcels to be sorted into the storage devices under the parcel outlets.

Combining with the second aspect, an example of the present invention provides a first possible embodiment of the second aspect, wherein each of the parcel checking inlets is provided with one parcel information acquisition device, the parcel checking inlets respectively are in one-to-one correspondence with the parcel information acquisition devices, and obtaining the destinations of the parcels to be sorted includes:

acquiring, by respective parcel information acquisition devices, the parcel information of the parcels to be sorted that enter the parcel checking inlets corresponding to the parcel information acquisition devices, wherein the parcel information contains destinations of the parcels to be sorted.

Combining with the first possible embodiment of the second aspect, an example of the present invention provides a second possible embodiment of the second aspect, wherein the system further includes a control device and a plurality of mobile transport devices, the correspondence relationships between the parcel outlets and the parcels to be sorted that go to different destinations are preset in the control device, and transporting the parcels to be sorted to the parcel outlets corresponding to the destinations of the parcels to be sorted includes:

obtaining, by the control device, the parcel information acquired by all the parcel information acquisition devices to obtain the destinations of the respective parcels to be sorted; and controlling at least one of the mobile transport devices, according to the obtained destinations of the parcels to be sorted to transport the parcels to be sorted to the parcel outlets corresponding to the destinations of the parcels to be sorted.

Combining with the second possible embodiment of the second aspect, an example of the present invention provides a third possible embodiment of the second aspect, wherein the system further includes a detection device and a transfer device, and the method further comprises:

obtaining, by the control device, the information detected by the detection device about whether the storage device is full or not, and when obtaining information indicating that the storage device is full, transmitting to the transfer device an instruction for transferring the storage device which is full.

Combining with the third possible embodiment of the second aspect, an example of the present invention provides a fourth possible embodiment of the second aspect, wherein each of the mobile transport devices is configured to load one parcel to be sorted or a plurality of parcels to be sorted that go to the same destination;

The destination information is carried in a destination address information code, the destination address information code is provided on the parcel to be sorted, each of the parcel information acquisition devices includes a scanner, and the scanner is configured to scan the information code for obtaining the destination of the parcel to be sorted.

The methods and systems provided in the examples of the present invention creatively utilize a "double" structure, with the parcel sorting device and the parcel collecting device being arranged up and down for sorting parcels, wherein the parcel outlets on the parcel sorting device are in communication with the parcel collecting device, and during parcel sorting, the parcels to be sorted can enter the parcel collecting device arranged below just by passing through the parcel outlets, thereby completing the sorting. Such a structural design enables that the parcel outlets can be flexibly arranged at the edges of the parcel sorting device or at middle positions of the edges, rather than only being provided at the edges of the parcel sorting device as those in the prior art, which effectively improves the utilization ratio of the parcel sorting device, avoids parcel accumulation, shortens the transport path for parcel sorting, and increases the parcel sorting efficiency, realizing an ingenious design.

Furthermore, in the methods and systems provided in the examples of the present invention, a plurality of parcel checking inlets are provided, with each of the parcel checking inlets being provided with one parcel information acquisition device, such that the information acquisition and sorting of the parcels to be sorted can be performed simultaneously at the plurality of parcel checking inlets, so as to significantly increase the parcel information acquisition efficiency, thereby improving the parcel sorting efficiency.

Furthermore, in the methods and systems provided in the examples of the present invention, a plurality of mobile transport devices that are independent from each other are employed for performing parcel transporting, where each mobile transport device has a relatively high flexibility of use, for example, according to the number of the parcels to be sorted, a corresponding number of mobile transport devices can be controlled to operate; and the travel route is flexible and variable. Therefore, such a mode of parcel transport has a relatively high efficiency, a relatively strong flexibility and a relatively high cost performance, which meets actual demands better.

Furthermore, in the methods and systems provided in the examples of the present invention, a detection device and a transfer device are provided, and when the detection device detects that a storage device is full of parcels, the control device may control the transfer device to transfer the storage device full of parcels, which avoids parcel accumulation and assures the reliability and intellectuality of sorting.

Furthermore, the methods and systems provided in the examples of the present invention are convenient to carry out, can significantly improve the parcel sorting efficiency, have prominent substantive features and represent notable progresses, and are suitable for large-scale popularization and application.

In order to make the above-mentioned objects, features and advantages of the present invention clearer and easier to understand, in the following contents, preferable examples are particularly enumerated and described in details with reference to the accompanying figures.

BRIEF DESCRIPTION OF THE DRAWINGS

In order to describe the technical solutions of the examples of the present invention more clearly, the figures required to be used for the examples will be briefly introduced below. It should be understood that the following figures only show some examples of the present invention, and thus shall not be construed as limiting the scope thereof; and for a person skilled in the art, further relevant figures could also be obtained according to the figures without using inventive efforts.

DETAILED DESCRIPTION OF THE EMBODIMENTS

Below, the technical solutions in the examples of the present invention are depicted clearly and comprehensively with reference to the figures according to the examples of the present invention. Obviously, the examples depicted here are merely some examples, but not all examples of the present invention. In general, the components in the examples of the present invention depicted and shown in the figures herein can be arranged and designed according to different configurations. Thus, detailed description of the examples of the present invention provided in the figures below are not intended to limit the scope of the present invention as claimed, but merely represent selected examples of the present invention. On the basis of the examples of the present invention, all of other examples that could be obtained by a person skilled in the art without using inventive efforts will fall within the scope of protection of the present invention.

Example 1

Figure 1:
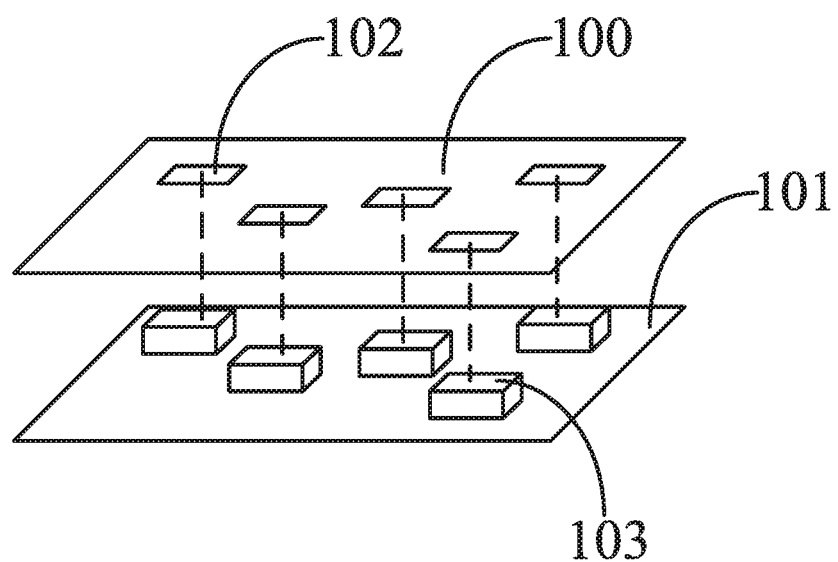
FIG. 1 shows a structural schematic diagram of a sorting system provided in Example 1 of the present invention.

In order to solve the problem existing in the prior art that the parcel sorting efficiency needs to be increased, as shown in FIG. 1, an example of the present invention provides a parcel sorting system. The parcel sorting system includes a parcel sorting device 100 and a parcel collecting device 101; the parcel sorting device 100 is provided thereon with a plurality of parcel checking inlets 104 and a plurality of parcel outlets 102, and the parcel collecting device 101 is located just below the parcel sorting device 100; the plurality of parcel outlets 102 on the parcel sorting device 100 are respectively in communication with the parcel collecting device 101, the plurality of parcel outlets 102 are respectively located at the middle or/and edges of the parcel sorting device 100, and the parcel collecting device 101 is provided thereon with storage devices 103, with one storage device located at each of positions of the parcel outlets, and an opening diameter of the storage device 103 is greater than a diameter of the parcel outlet 102.

The parcel sorting device 100 and the parcel collecting device 101 are embodied in many structures, e.g. quadrangle, circle, polygon and so on, and the parcel collecting device 101 and the parcel sorting device 100 preferably have substantially same area.

In order to improve the parcel sorting efficiency, preferably, each of the parcel checking inlets 104 is provided with one parcel information acquisition device 200, the parcel checking inlets 104 are in one-to-one correspondence with the parcel information acquisition devices 200, the parcel information acquisition devices 200 are configured to acquire parcel information of the parcels to be sorted that enter the parcel checking inlets 104 corresponding to the parcel information acquisition devices 200, and the parcel information contains destinations of the parcels to be sorted.

A plurality of parcel checking inlets 104 are provided, with each parcel checking inlet 104 being provided with a parcel information acquisition device 200, such that the information acquisition and sorting of the plurality of parcels to be sorted may be performed simultaneously at the plurality of parcel checking inlets 104, so as to significantly increase the parcel information acquisition efficiency, thereby improving the parcel sorting efficiency.

In the above, there are many manners for the parcel information acquisition devices 200 to acquire the parcel information of the parcels to be sorted. Preferably, the destination information is carried in a destination address information code, the destination address information code is provided on the parcel to be sorted, each of the parcel information acquisition devices 200 includes a scanner, and the scanner is configured to scan the information code for obtaining the destination of the parcel to be sorted. For example, the parcels to be sorted are provided thereon with information codes containing destination information of the parcels to be sorted, and the parcel information acquisition devices 200 obtain the destinations of the parcels to be sorted by scanning the information codes on the parcels to be sorted, wherein the information code may be a bar code, a two-dimensional code, a radio frequency tag etc., and correspondingly, the parcel information acquisition device 200 may be a bar code scanner, a two-dimensional code scanner, a radio frequency identifier, etc., and the mobile transport device 202 may be an auto-navigating small vehicle.

According to actual demands, in addition to the destination, the parcel information may further contain information about the parcel volume, weight etc., and correspondingly, the parcel information acquisition device 200 may further include a weighing device, a volume scanner, etc.

While the parcel information is highly-efficiently obtained, in order to improve the efficiency of subsequent sorting, preferably, after the plurality of parcel information acquisition devices 200 simultaneously acquire the parcel information of the respective parcels to be sorted, the control device 201 is used to complete the analytical processing of the obtained parcel information of all the parcels to be sorted, thereby obtaining the destination information of the respective parcels to be sorted. For example, the system further includes a control device 201, the control device 201 is in connection with all the parcel information acquisition devices 200 so as to obtain the parcel information acquired by all the parcel information acquisition devices 200, to obtain the destinations of the respective parcels to be sorted.

Figure 2:
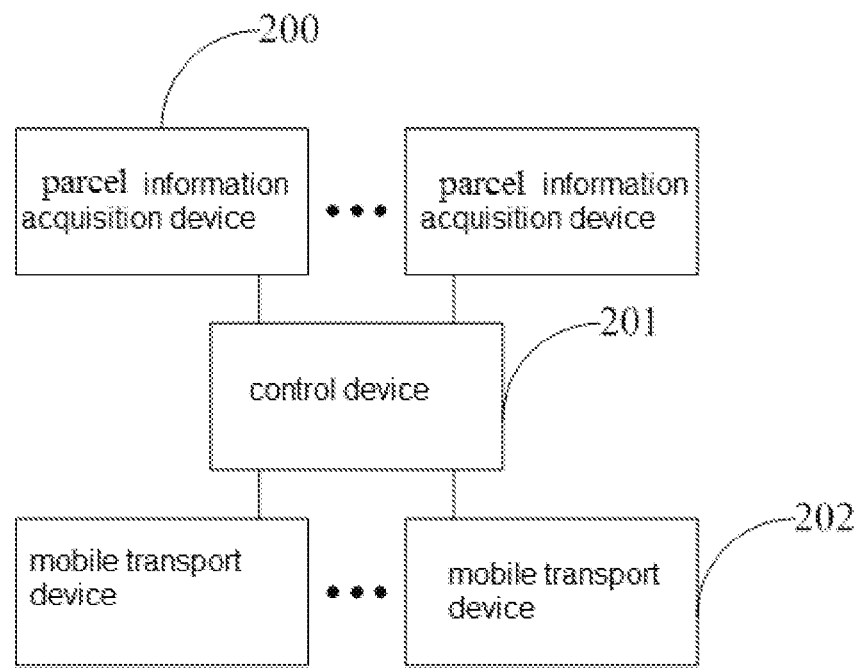
FIG. 2 shows a system chart of the sorting system provided in Example 1 of the present invention.

After obtaining the parcel information, in order to improve the efficiency of the subsequent sorting processes, the system preferably further includes a plurality of mobile transport devices 202, wherein the plurality of mobile transport devices 202 are in connection with the control device 201, the control device 201 is pre-provided with parcel outlets 102 respectively corresponding to different destinations, the control device 201 is further configured to control, according to the obtained destinations of the parcels to be sorted, at least one of the mobile transport devices 202 to transport the parcels to be sorted to the parcel outlets 102 corresponding to the destinations of the parcels to be sorted, as shown in FIG. 2.

In the above, the control device 201 has already obtained the destinations of the respective parcels to be sorted at the respective parcel checking inlets 104, and the parcel sorting can be completed just by obtaining the transport paths of the respective parcels to be sorted through analysis according to the positions of the parcel outlets 102 corresponding to the destinations of the respective parcels to be sorted, and then controlling at least one of the mobile transport devices 202 to transport, according to the transport paths, each of the parcels to be sorted to the parcel outlets 102 corresponding to the destinations of the parcels to be sorted.

The analysis by the control device 201 on the transport paths of the respective parcels to be sorted is performed simultaneously. After the path analysis is completed, the plurality of mobile transport devices 202 may be simultaneously controlled, to simultaneously complete transporting of the individual parcels to be sorted, thereby significantly improving the parcel sorting efficiency.

Each of the mobile transport devices 202 is configured to load one parcel to be sorted or a plurality of parcels to be sorted that go to the same destination. Preferably, the mobile transport device 202 is configured to transport one parcel to be sorted one time, and the control device 201 sends a control instruction to the mobile transport device 202 after obtaining the destination of the parcel to be sorted that is going to be transported by the mobile transport device 202, such that the mobile transport device 202 travels to the position of the parcel outlet 102 corresponding to the destination of the parcel to be sorted.

In the above, the parcels to be sorted may be manually loaded onto the mobile transport devices 202, and the parcels to be sorted may also be automatically loaded onto the mobile transport devices 202 by intelligently controlling parcel gripping devices or the like through the control device 201. Similarly, the transport of the parcels to be sorted from the parcel outlets 102 to the parcel collecting device 101 can be performed manually, and may also be completed by intelligently controlling parcel gripping devices or the like through the control device 201.

Figure 3:
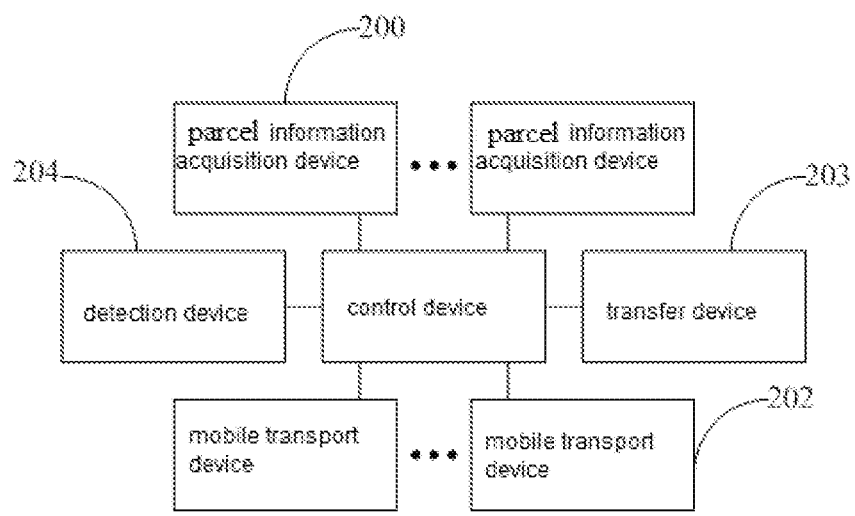
FIG. 3 shows a system chart of another sorting system provided in Example 1 of e present invention.
Figure 4:
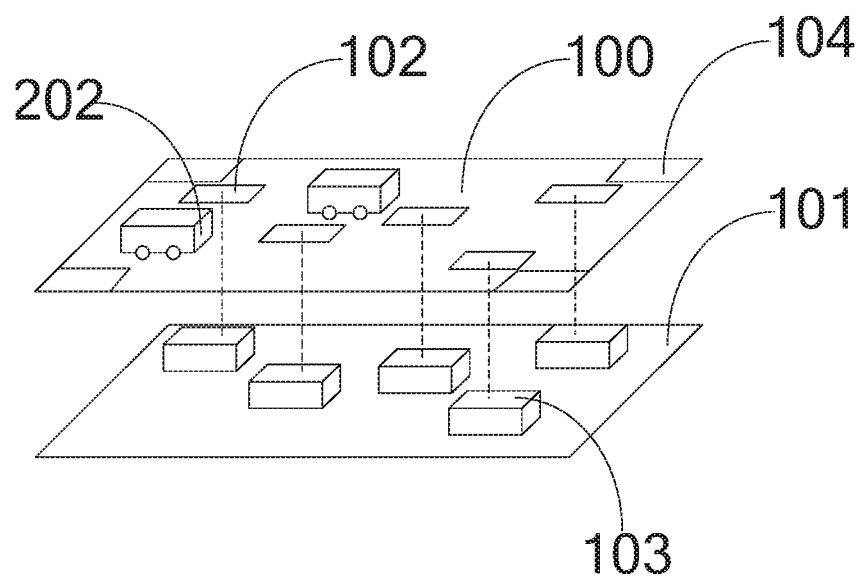
FIG. 4 shows a structural schematic diagram of another sorting system provided in Example 1 of the present invention.

In order to assure that the respective parcels to be sorted that are transported into the parcel collecting device 101 can be delivered in time, the system preferably further includes a detection device 204 and a transfer device 203, wherein the detection device 204 is configured to detect whether a storage device 103 is full or not and to transmit to the control device 201 the obtained information regarding whether the storage device 103 is full or not, and the transfer device 203 is configured to transfer the storage device 103 which is full according to an instruction from the control device 201. There are many options for the transfer device 203, e.g. an intelligent robot; and for another example, the storage device 103 is mounted on the transfer device 203, and the transfer device 203 is a large-scale auto-navigating vehicle and may move to a position and load and unload the parcels according to the control instruction of the control device 201, as shown in FIGS. 3 and 4.

Based on the above-mentioned system architecture, the examples of the present invention are implemented as follows:

the respective mobile transport devices 202 transport the parcels to be sorted to the respective parcel checking inlets 104, and the parcel information acquisition devices 200 at the respective parcel checking inlets 104 acquire the parcel information of the respective parcels and transmit the acquired parcel information to the control device 201, the control device 201 performs simultaneous analysis on the parcel information of the plurality of parcels to be sorted to obtain the destinations of the respective parcels to be sorted and the parcel outlets 102 corresponding to the respective destinations, and controls the plurality of mobile transport devices 202 to simultaneously transport the respective parcels to be sorted to the corresponding parcel outlets 102, the parcels to be sorted are delivered from the parcel outlets 102 into the storage devices 103 on the parcel collecting device 101 located below, and then they are moved away from the parcel outlets 102 according to a control instruction of the control device 201 and waits for further instructions; and the processes above are repeated till all the parcels to be sorted are delivered into the storage devices 103. In the meantime, the detection device 204 constantly detects whether there is a storage device 203 which is full of parcels, and when there is a storage device 103 full of parcels, the control device 201 controls the transfer device 203 to transfer the storage device 103 and placing an empty storage device 103 at the position where the transferred storage device 103 was, till sorting of all the parcels to be sorted is completed.

The parcel sorting system provided in an example of the present invention can make full use of the area of the parcel sorting device 100, increasing a plurality of effective parcel outlets 102 and solving the traditional problem of goods accumulation and thereby greatly increasing checking efficiency, so as to make the whole operation flow of the parcel sorting more systematized and intelligentized; and a "double" structure is creatively adopted, with the parcel sorting device 100 and the parcel collecting device 101 being arranged one above the other for sorting parcels, wherein the parcel outlets 102 on the parcel sorting device 100 are in communication with the parcel collecting device 101, and during parcel sorting, the parcels to be sorted can enter the parcel collecting device 101 arranged below just by passing through the parcel outlets 102, thereby completing the sorting. Such a structural design enables that the parcel outlets 102 can be flexibly arranged on the edges of the parcel sorting device 100 or at middle positions of the edges, rather than only being provided at the edges of the parcel sorting device 100 as those in the prior art, and the middle position in the examples of the present invention refers to positions on the parcel sorting device 100 other than the edges. The utilization ratio of the parcel sorting device 100 is efficiently improved, the transport path for parcel sorting is shortened, the parcel sorting efficiency is increased, and the design is very ingenious.

Example 2

Figure 5:
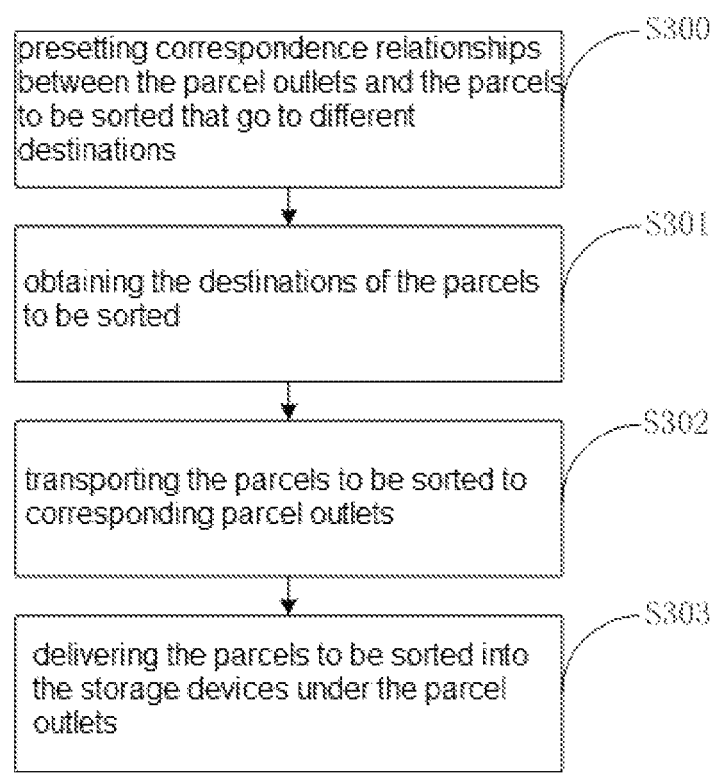
FIG. 5 shows a schematic flow diagram for sorting provided in Example 2 of the present invention.

As shown in FIG. 5, an example of the present invention provides a parcel sorting method, which is applied to a parcel sorting system, wherein the parcel sorting system comprises a parcel sorting device and a parcel collecting device; the parcel sorting device is provided with a plurality of parcel checking inlets and a plurality of parcel outlets, and the parcel collecting device is located just below the parcel sorting device; the plurality of parcel outlets on the parcel sorting device are respectively in communication with the parcel collecting device, the plurality of parcel outlets are respectively located at the middle or/and edges of the parcel sorting device, and the parcel collecting device is respectively provided thereon with storage devices, with one storage device located at each of positions the parcel outlets, and an opening diameter of the storage device is greater than a diameter of the parcel outlet; and the method includes:

step S300: presetting correspondence relationships between the parcel outlets and the parcels to be sorted that go to different destinations; step S301: obtaining the destinations of the parcels to be sorted; step S302: transporting the parcels to be sorted to the parcel outlets corresponding to the destinations of the parcels to be sorted; and step S303: delivering, through the parcel outlets, the parcels to be sorted into the storage devices under the parcel outlets.

In order to improve the parcel sorting efficiency, preferably, each of the parcel checking inlets is provided with one parcel information acquisition device, the parcel checking inlets are in one-to-one correspondence with the parcel information acquisition devices, and obtaining the destinations of the parcels to be sorted includes: acquiring, by the respective parcel information acquisition devices, the parcel information of the parcels to be sorted that enter the parcel checking inlets corresponding to the parcel information acquisition devices, with the parcel information containing the destinations of the parcels to be sorted.

There are many manners for the parcel information acquisition devices to acquire the parcel information on the parcels to be sorted. Preferably, the destination information is carried in a destination address information code, the destination address information code is provided on the parcel to be sorted, each of the parcel information acquisition devices includes a scanner, and the scanner is configured to scan the information code for obtaining the destination of the parcel to be sorted. For example, the parcels to be sorted are provided thereon with information codes containing destination information of the parcels to be sorted, and the parcel information acquisition devices obtain the destinations of the parcels to be sorted by scanning the information codes on the parcels to be sorted, wherein the information code may be a bar code, a QR code, an RF Tag etc., and correspondingly, the parcel information acquisition device may be a bar code scanner, a two-dimensional code scanner, a radio frequency identifier, etc., and the mobile transport device may be an auto-navigating small vehicle.

According to actual demands, in addition to the destination, the parcel information may further contain information about the parcel volume, weight etc., and correspondingly, the parcel information acquisition device may further include a weighing device, a volume scanner, etc.

While the parcel information is highly-efficiently obtained, in order to improve the efficiency of subsequent sorting, preferably, after the plurality of parcel information acquisition devices simultaneously acquire the parcel information of the respective parcels to be sorted, the control device is used to complete the analytical processing of the obtained parcel information of all the parcels to be sorted, thereby obtaining the destination information of the respective parcels to be sorted. For example, the system further includes a control device and a plurality of mobile transport devices, wherein the correspondence relationships between the parcel outlets and the parcels to be sorted that go to different destinations are preset in the control device, and transporting the parcels to be sorted to the parcel outlets corresponding to the destinations of the parcels to be sorted includes: obtaining, by the control device, the parcel information acquired by all the parcel information acquisition devices to obtain the destinations of the respective parcels to be sorted; and controlling at least one of the mobile transport devices, according to the obtained destinations of the parcels to be sorted, to transport the parcels to be sorted to the parcel outlets corresponding to the destinations of the parcels to be sorted.

After obtaining the parcel information, in order to improve the efficiency of the subsequent sorting processes, the system preferably further includes a detection device and a transfer device, and the method further includes: obtaining, by the control device, the information detected by the detection device about whether the storage device is full or not, and when obtaining information indicating that the storage device is full, transmitting to the transfer device an instruction for transferring the storage device which is full.

In the above, the control device has already obtained the destinations of the respective parcels to be sorted at the respective parcel checking inlets, and the parcel sorting can be completed just by obtaining the transport paths of the respective parcels to be sorted through analysis according to the positions of the parcel outlets corresponding to the destinations of the respective parcels to be sorted, and then controlling at least one of the mobile transport devices to transport, according to the transport paths, each of the parcels to be sorted to the parcel outlets corresponding to the destinations of the parcels to be sorted.

The analysis by the control device on the transport paths of the respective parcels to be sorted is performed simultaneously. After completing the path analysis, the plurality of mobile transport devices may be simultaneously controlled to simultaneously complete transporting of the respective parcels to be sorted, thereby significantly improving the parcel sorting efficiency.

Each of the mobile transport devices is configured to load one parcel to be sorted or a plurality of parcels to be sorted that go to the same destination. Preferably, the mobile transport device is configured to transport one parcel to be sorted one time, and the control device sends a control instruction to the mobile transport device after obtaining the destination of the parcel to be sorted that is going to be transported by the mobile transport device, such that the mobile transport device travels to the position of the parcel outlet corresponding to the destination of the parcel to be sorted.

In the above, the parcels to be sorted may be manually loaded onto the mobile transport device, and the parcels to be sorted may also be automatically loaded onto the mobile transport devices by intelligently controlling parcel gripping devices or the like through the control device. Similarly, the transport of the parcels to be sorted from the parcel outlets to the parcel collecting device can be performed manually, and may also be completed by intelligently controlling parcel gripping devices or the like through the control device.

As to the methods provided in the examples of the present invention, the implementation principles and the technical effects produced thereof are the same as those in the preceding examples regarding the systems, and for brief description, as for contents not mentioned in the examples regarding the methods, reference can be made to the corresponding contents in the preceding examples regarding the systems.

As to the above, they are merely specific embodiments of the present invention; however, the scope of protection of the present invention is not limited thereto, and within the disclosed technical scope of the present invention, any modifications or substitutions that a person skilled in the art could readily conceive of should fall within the scope of protection of the present invention. Thus, the scope of protection of the present invention shall be determined by the scope of protection of the appended claims.

The invention claimed is:

1. A parcel sorting system, comprising a parcel sorting device and a parcel collecting device, wherein the parcel sorting device is provided with a plurality of parcel checking inlets and a plurality of parcel outlets, and the parcel collecting device is located directly below the parcel sorting device; and the plurality of parcel outlets on the parcel sorting device are respectively in communication with the parcel collecting device; the plurality of parcel outlets are respectively located at the middle and edges of the parcel sorting device; and the parcel collecting device is provided thereon with storage devices, with one storage device located at each of positions under parcel outlets, and an opening diameter of the storage device is greater than a diameter of the parcel outlets.

2. The parcel sorting system according to claim 1, wherein each of the parcel checking inlets is provided with one parcel information acquisition device; the parcel checking inlets are in one-to-one correspondence with the parcel information acquisition devices, the parcel information acquisition devices are configured to acquire parcel information of the parcels to be sorted that enter the parcel checking inlets corresponding to the parcel information acquisition devices, and the parcel information contains destinations of the parcels to be sorted.

3. The parcel sorting system according to claim 2, wherein the system further comprises a control device, and the control device is in connection with all the parcel information acquisition devices so as to obtain the parcel information acquired by all the parcel information acquisition devices, to obtain the destinations of the respective parcels to be sorted; and the system further comprises a plurality of mobile transport devices, the mobile transport devices are all in connection with the control device, the control device is pre-provided with parcel outlets respectively corresponding to different destinations, and the control device is further configured to control, according to the obtained destinations of the parcels to be sorted, at least one of the mobile transport devices to transport the parcels to be sorted to the parcel outlets corresponding to the destinations of the parcels to be sorted.

4. The parcel sorting system according to claim 3, wherein the system further comprises a detection device and a transfer device, the detection device is configured to detect whether the storage device is full and to transmit to the control device the obtained information about whether the storage device is full, and the transfer device is configured to transfer the storage device which is full according to an instruction from the control device.

5. The parcel sorting system according to claim 4, wherein each of the mobile transport devices is configured to load one parcel to be sorted or a plurality of parcels to be sorted that go to a same destination; and the destination information is carried in a destination address information code, the destination address information code is provided on the parcel to be sorted, each of the parcel information acquisition devices comprises a scanner, and the scanner is configured to scan the information code for obtaining the destination of the parcel to be sorted.

6. A parcel sorting method applied to a parcel sorting system, wherein the parcel sorting system comprises a parcel sorting device and a parcel collecting device; the parcel sorting B device is provided with a plurality of parcel checking inlets and a plurality of parcel outlets, and the parcel collecting device is located directly below the parcel sorting device; the plurality of the parcel outlets on the parcel sorting device are respectively in communication with the parcel collecting device, and the plurality of the parcel outlets are respectively located at the middle and edges of the parcel sorting device; and the parcel collecting device is provided thereon storage-devices, with one storage device located at each of positions under the parcel outlets, an opening diameter of the storage device is greater than a diameter of the parcel outlet, and the method comprises:

presetting correspondence relationships between the parcel outlets and the parcels to be sorted that go to different destinations;

obtaining the destinations of the parcels to be sorted;

transporting the parcels to be sorted to the parcel outlets corresponding to the destinations of the parcels to be sorted; and delivering, through the parcel outlets, the parcels to be sorted into the storage devices under the parcel outlets.

7. The parcel sorting method according to claim 6, wherein each of the parcel checking inlets is provided with one parcel information acquisition device, the parcel checking inlets are in one-to-one correspondence with the parcel information acquisition devices, and the step of obtaining the destinations of the parcels to be sorted comprises:

acquiring, by individual parcel information acquisition devices, the parcel information of the parcels to be sorted that enter the parcel checking inlets corresponding to the parcel information acquisition devices, with the parcel information containing the destinations of the parcels to be sorted.

8. The parcel sorting method according to claim 7, wherein the system further comprises a control device and a plurality of mobile transport devices, the correspondence relationships between the parcel outlets and the parcels to be sorted that go to different destinations are preset in the control device, and the step of transporting the parcels to be sorted to the parcel outlets corresponding to the destinations of the parcels to be sorted, comprises:

obtaining, by the control device, the parcel information acquired by all the parcel information acquisition devices to obtain the destinations of the respective parcels to be sorted; and controlling at least one of the mobile transport devices according to the obtained destinations of the parcels to be sorted to transport the parcels to be sorted to the parcel outlets corresponding to the destinations of the parcels to be sorted.

9. The parcel sorting method according to claim 8, wherein the system further comprises a detection device and a transfer device, and the method further comprises:

obtaining, by the control device, the information detected by the detection device about whether the storage device is full or not, and when obtaining information indicating that the storage device is full, transmitting to the transfer device an instruction for transferring the storage device which is full.

10. The parcel sorting method according to claim 9, wherein each of the mobile transport devices is configured to load one parcel to be sorted or a plurality of parcels to be sorted that go to a same destination; and the destination information is carried in a destination address information code, the destination address information code are provided on the parcel to be sorted, each of the parcel information acquisition devices comprises a scanner, and the scanner is configured to scan the information code for obtaining the destinations of the parcels to be sorted.

* * * * *

UNITED STATES PATENT AND TRADEMARK OFFICE
CERTIFICATE OF CORRECTION

PATENT NO. : 10,245,620 B2  
APPLICATION NO. : 15/326411  
DATED : April 2, 2019  
INVENTOR(S) : Xu et al.

Page 1 of 1

It is certified that error appears in the above-identified patent and that said Letters Patent is hereby corrected as shown below:

On the Title Page

In item (73), in "Assignees", in Column 1, Line 2, delete "Jianqing" and insert --Jianqiang-- therefor In the Specification In Column 7, Line 67, delete "203" and insert --103-- therefor In the Claims In Column 11, Line 47, in Claim 6, after "sorting", delete "B"

In Column 11, Line 55, in Claim 6, delete "storage-devices," and insert --storage devices,-- therefor Signed and Sealed this  
Twenty-first Day of April, 2020

Andrei Iancu  
*Director of the United States Patent and Trademark Office*